United States Patent
Darcy, III et al.

(10) Patent No.: US 7,238,254 B2
(45) Date of Patent: Jul. 3, 2007

(54) LASER WELDED PHOTORECEPTOR BELTS WITH QUARTZ PRESSURE PLATE WELDING SEAM CONTROL

(75) Inventors: John J. Darcy, III, Webster, NY (US); Michael S. Roetker, Webster, NY (US)

(73) Assignee: Xerox Corporation, Stamford, CT (US)

( * ) Notice: Subject to any disclaimer, the term of this patent is extended or adjusted under 35 U.S.C. 154(b) by 474 days.

(21) Appl. No.: 10/871,208

(22) Filed: Jun. 18, 2004

(65) Prior Publication Data

US 2005/0279448 A1    Dec. 22, 2005

(51) Int. Cl.
*B32B 37/00* (2006.01)

(52) U.S. Cl. ............ 156/272.8; 156/137; 156/308.2; 156/308.4; 156/309.6

(58) Field of Classification Search ........ 156/137, 156/272.8, 308.2, 309.6, 308.4
See application file for complete search history.

(56) References Cited

U.S. PATENT DOCUMENTS

| | | | |
|---|---|---|---|
| 4,289,559 A | 9/1981 | Murphy | |
| 4,532,166 A * | 7/1985 | Thomsen et al. | 428/57 |
| 4,838,964 A | 6/1989 | Thomsen et al. | |
| 4,878,985 A | 11/1989 | Thomsen et al. | |
| 5,085,719 A * | 2/1992 | Eck | 156/73.4 |
| 5,190,608 A | 3/1993 | Darcy et al. | |
| 5,549,999 A | 8/1996 | Swain et al. | |
| 5,552,005 A | 9/1996 | Mammino et al. | |
| 5,582,949 A | 12/1996 | Bigelow et al. | |
| 6,074,504 A | 6/2000 | Yu et al. | |
| 6,245,402 B1 | 6/2001 | Schlueter, Jr. et al. | |
| 6,277,534 B1 | 8/2001 | Foltz et al. | |
| 6,328,922 B1 * | 12/2001 | Mishra et al. | 156/304.6 |
| 6,358,347 B1 | 3/2002 | Thornton et al. | |
| 2003/0222078 A1 | 12/2003 | Yu | |
| 2004/0035524 A1* | 2/2004 | Link | 156/272.8 |

FOREIGN PATENT DOCUMENTS

GB    2278571 A    * 12/1994

\* cited by examiner

*Primary Examiner*—Jeff H. Aftergut

(57) ABSTRACT

A method of welding together the ends of a web segment of a thermally weldable material, such as for a xerographic photoreceptor or intermediate transfer belt, to form an endless loop belt with a welded seam, by compressing the web segment ends in a welding area with a weld-splash confining laser-light transmissive glass plate, and applying sufficient laser-light energy through that glass plate to thermally weld the web ends together into a smoothly welded seam. The side of the belt opposite from the glass plate may be held by a pneumatic holding system. The side of the glass plate pressing against the web ends may have a slightly convex parabolic shape.

5 Claims, 2 Drawing Sheets

LASER WELDED PHOTORECEPTOR BELTS WITH QUARTZ PRESSURE PLATE WELDING SEAM CONTROL

Figure 1:
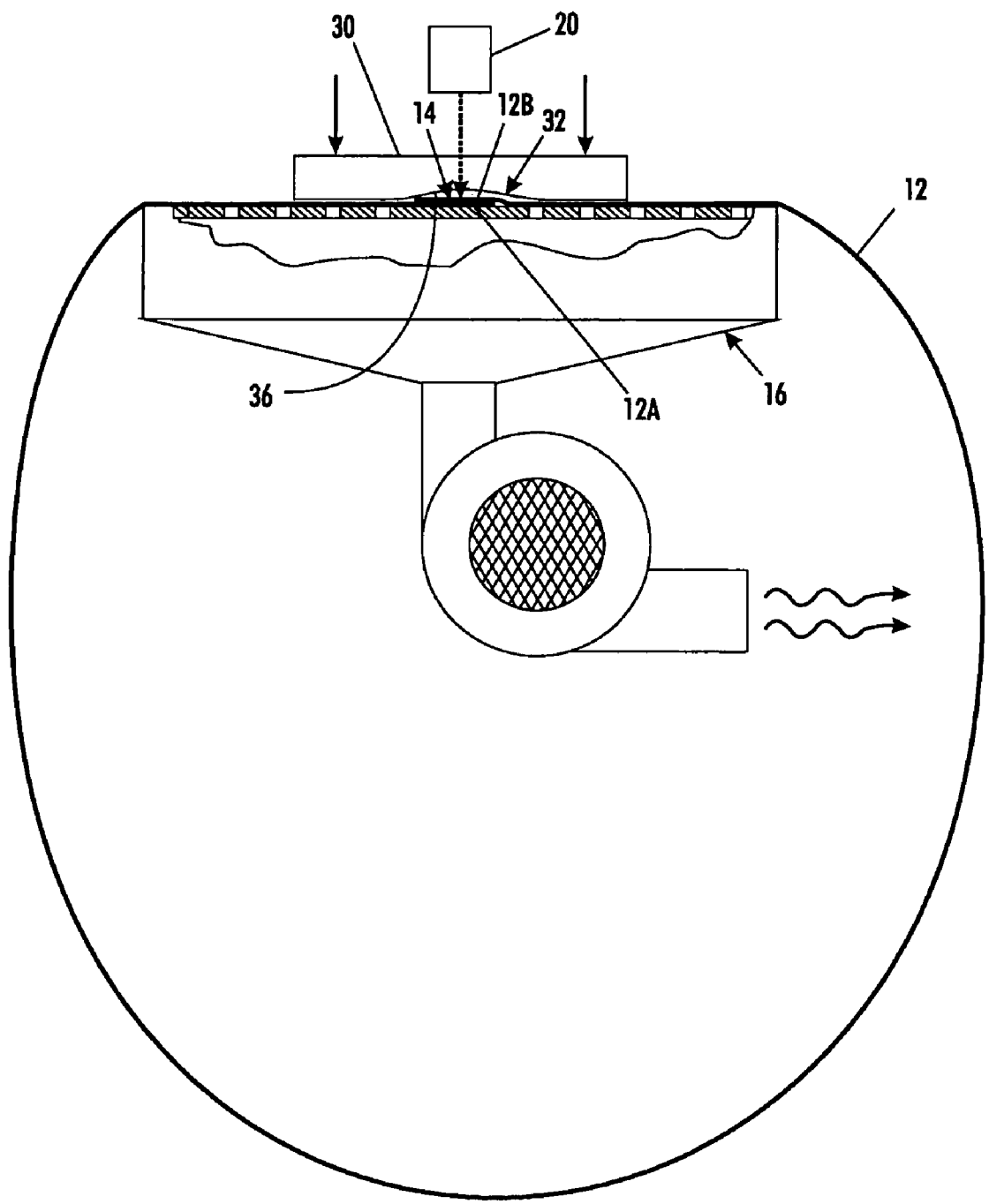

Disclosed in the embodiments herein is an improved system for welding together the ends of xerographic photoreceptor belts or other thermally weldable belt material into endless belts with smoother seams, having reduced "weld splash" problems, using suitable laser welding through an appropriate laser-spectra-transmissible glass pressure plate (hold-down plate) in the belt seam welding area.

Various types, and methods of manufacture, are known in the art, of endless belts that are made from cut sections of a thin web material that are fastened together at opposite ends, including xerographic photoreceptor belts and intermediate image transfer belts. The following U.S. patent disclosures are noted by way of some examples: U.S. Pat. No. 4,289,559, issued Sep. 15, 1981 to Murphy; U.S. Pat. No. 4,838,964, issued Jun. 13, 1989 to Thomsen et al; U.S. Pat. No. 4,878,985, issued Nov. 7, 1989 to Thomsen et al; U.S. Pat. No. 5,190,608, issued Mar. 2, 1993 to Darcy et al; U.S. Pat. No. 5,549,999, issued Aug. 27, 1996 to Swain et al; U.S. Pat. No. 5,552,005, issued Sep. 3, 1996 to Mammino et al; U.S. Pat. No. 5,582,949, issued Dec. 10, 1996 to Bigelow et al; U.S. Pat. No. 6,074,504, issued Jun. 13, 2000 to Yu et al; U.S. Pat. No. 6,197,461, issued Mar. 6, 2001 to Foltz et al; U.S. Pat. No. 6,245,402, issued Jun. 12, 2001 to Schueter, et al; U.S. Pat. No. 6,277,534, issued Aug. 21, 2001 to Foltz et al; U.S. Pat. No. 6,328,922, issued Dec. 11, 2001 to Mishra et al; U.S. Pat. No. 6,358,347 issued Mar. 17, 2002 to Thornton et al; and U.S. Publication No. 20030222078, published Dec. 4, 2003, for U.S. application Ser. No. 10/063,974, filed May 30, 2002 now U.S. Pat. No. 6,803,549, issued Oct. 12, 2004.

Current xerographic photoreceptor (PR) endless belt manufacture by joining (seaming) the belt web ends together generally utilizes ultrasonic welding techniques for welding together overlapping small end areas of the belt web for the formation of the endless flexible photoreceptor belt imaging loop with a welded seam. As shown in the above-cited and other art, the web ends can be lapped, beveled and/or angle-cut, with transverse, diagonally transverse, and/or puzzle-cut seams.

The present commercial ultrasonic welding process can create a rough or irregular "weld splash" adjacent to the weld area on both the top and bottom sides of the seamed area of the formed endless belt. This weld splash can causes excessive wear on a photoreceptor cleaning blade engaging the belt surface during operation, and/or allow contamination particles to become trapped under the blade which can cause streaks on the photoreceptor and hence on the print media prints being made therefrom. This weld splash area is also typically more brittle, and thus, after the extensively repeated cycling of the PR belt required for xerography, the weld splash area can crack, delaminate, and even flake off, causing those and other operating problems.

As is well know in xerography, the latent image to be ultimately printed can be electrically formed on the surface of a cleaned and charged plural-layer light-sensitive photoreceptor material. That surface can then be developed with toner or other developer material, which can then be directly transferred to print media such as paper sheets. Alternatively, as is also well known, the developed image can be first transferred to an intermediate image transfer belt and then transferred to the print media. Various suitable materials for either PR belts or intermediate transfer belts, and their important properties and uses, are well know in the art and need not be described herein. Nor is this disclosed system limited in application to xerographic belt materials.

A specific feature of the specific embodiments disclosed herein is to provide a method of welding together in a welding area the ends of a web segment comprising a thermally weldable material to form an endless loop belt with a welded seam; comprising compressing the ends of said web segment in said welding area with a weld-splash confining laser-light transmissive glass plate, and applying sufficient laser-light energy through said laser-light transmissive glass plate to said ends of said web segment in said weld area to thermally weld said ends together into a smoothly welded seam.

Further specific features disclosed in the embodiments herein, individually or in combination, include those wherein said endless belt is a xerographic photoreceptor belt; and/or wherein said endless belt is an intermediate image transfer belt; and/or wherein said ends of said web segment are held under pressure in said welding area by being compressed between a holding system on one side of said web segment and said weld-splash confining laser-light transmissive glass plate on the other side of said web segment; and/or wherein said holding system on one side of said web segment is a pneumatic holddown system with a planar surface opposite from said weld-splash confining laser-light transmissive glass plate; and/or wherein said weld-splash confining laser-light transmissive glass plate has a smoothly slightly concave surface in said welding area; and/or wherein said weld-splash confining laser-light transmissive glass plate has a slightly parabolic surface in said welding area; and/or a welding apparatus for welding together in a welding area the ends of a web segment comprising a thermally weldable material to form an endless belt with a welded seam, comprising a supporting surface on one side of said web segment for supporting said ends of said web segment in said welding area, and a weld-splash confining laser-light transmissive glass plate mounted to engage the opposite side of said ends of said web segment in said welding area to compress said ends of said web segment in said welding area between said supporting surface and said weld-splash confining laser-light transmissive glass plate, and a laser light source applying sufficient laser-light energy through said laser-light transmissive glass plate to said ends of said web segment in said weld area to thermally weld said ends together into a smoothly welded seam; and/or wherein said weld-splash confining laser-light transmissive glass plate has a slightly concave surface in said welding area; and/or wherein said weld-splash confining laser-light transmissive glass plate has a parabolic concave surface in said welding area.

The disclosed system may be operated and controlled by appropriate operation of conventional control systems. It is well known and preferable to program and execute control functions and logic with software instructions for conventional or general purpose microprocessors, as taught by numerous prior patents and commercial products. Such programming or software may, of course, vary depending on the particular functions, software type, and microprocessor or other computer system utilized, but will be available to, or readily programmable without undue experimentation from, functional descriptions, such as those provided herein, and/or prior knowledge of functions which are conventional, together with general knowledge in the software or computer arts. Alternatively, the disclosed control system or method may be implemented partially or fully in hardware, using standard logic circuits or single chip VLSI designs.

As to specific components of the subject apparatus or methods, or alternatives therefor, it will be appreciated that, as is normally the case, some such components are known per se in other apparatus or applications, which may be additionally or alternatively used herein, including those from art cited herein. For example, it will be appreciated by respective engineers and others that many of the particular component mountings, component actuations, or component drive systems illustrated herein are merely exemplary, and that the same novel motions and functions can be provided by many other known or readily available alternatives. All cited references, and their references, are incorporated by reference herein where appropriate for teachings of additional or alternative details, features, and/or technical background. What is well known to those skilled in the art need not be described herein.

Figure 2:
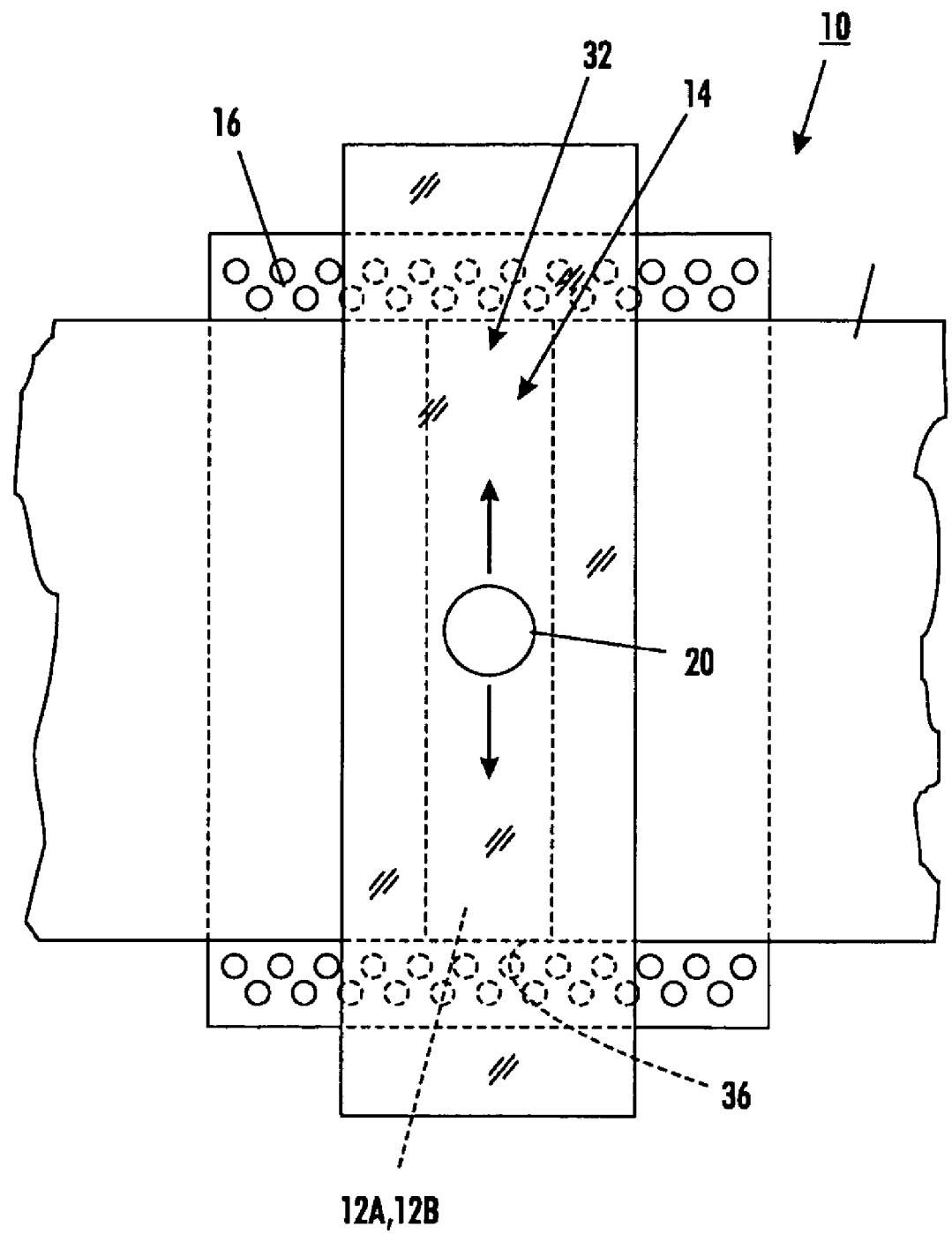

Various of the above-mentioned and further features and advantages will be apparent to those skilled in the art from the specific apparatus and its operation or methods described in the examples below, and the claims. Thus, the present invention will be better understood from this description of these specific embodiment(s), including the drawing figures (which are approximately to scale) wherein:

FIG. 1 is a schematic side view, partially in cross-section, of one example of a system and method for photoreceptor belt material being clamped and laser welded in a seam area to form an endless photoreceptor belt; and FIG. 2 is a top view of the embodiment of FIG. 1 showing the transverse movement of the laser welding of said seam area.

Describing now in further detail the exemplary embodiments of these Figures, there is shown a PR belt welding station 10, for forming an endless PR belt 12 by welding its overlapping thin film belt ends 12A and 12B in a belt welding, seaming or bonding area 14 (those three terms may be used alternatively herein), by way of one example of the subject system for forming an endless loop belt 12 with smoother seams, with improved properties as further described herein. As noted, this can be used for a flexible image loop PR or for an intermediate image transfer belt (versus U.S. Pat. No. 6,245,402 cited above).

The disclosed embodiments herein may use either a known ND: YAG laser optical light system, or a known Xenon "soft beam" laser optical light system, as a heating device for the thin film bonding of the overlapped belt ends 12A, 12B in the seam bonding area 14. Both said laser example embodiments are encompassed here by the schematic laser 20 representation in FIGS. 1 and 2. Both temperature and pressure are applied to the seamed area of the material in this welding station 10 to form a strong and smooth bond with a better surface profile than that of conventionally ultrasonically welded seams.

The PR material belt ends 12A and 12B may be overlapped to form a seam area approximately 1.2 mm wide and pressure held in that position during welding. The adjacent areas of the belt material may be held in place before and during the welding step by utilizing a conventional vacuum holding device 16 with a planar partial belt supporting surface, such as the FIG. 1 schematically illustrated vacuum weir arrangement (a vacuum platen jig), which similar to that currently used in PR belt production with ultrasonic seam welding.

However, in the disclosed embodiments, additionally there is applied with suitable pressure, to the opposite side of this overlapped belt ends seaming area, an optical quality flat or slightly parabolic surfaced quartz or other glass hold-down plate 30 that can transmit light at wavelengths of the laser being utilized, such as approximately 10.6 nanometers. The desired amount of pressure is not believed to be critical, and can be determined experimentally for the particular belt material and laser. This pressure application to the belt seaming area 14 is illustrated schematically here by the arrows. This pressure could be applied, for example, by either moving the vacuum holding device 16 up to a fixed position glass plate 30 via a conventional air cylinder, or, as shown, moving the glass plate 30 down onto the seaming area 14 with an applied weight, air cylinder, or other force system after the belt ends have been overlapped and are being held in place by the vacuum holding device 16. Either will form pressure on the overlapping belt ends 12A, 12B in the seaming area 14. Thus, the belt end areas 12A, 12B to be welded together are pressed between those two opposing surfaces 30 and 16 for their laser welding. The amount of such pressure applied to the seam may readily adjusted with an air pressure regulator that supplies air to such an air cylinder. As shown in the Figures, it is preferable not to have a vacuum hold-down system such as 16 have vacuum manifold surface holes 36 underlying the thermal seaming area 14, i.e., to have a smooth planer area there.

The laser energy from the laser 20 is then applied through the quartz or other suitable glass hold-down plate 30 to the seam area. The amount of such applied thermal energy may be controlled by the speed of the traverse movement of the laser 20, as shown by the movement arrow in FIG. 2, or of a light-connecting fiber optic bundle head assembly, and/or by a power output control and meter on the laser 20. This type of laser can also have a pulsed beam, in which the period and amplitude of the pulses can be adjusted.

A concave parabolic or other arcuate glass plate surface 32 facing the belt weld area can be used instead of a flat surface. Using a glass hold-down plate 30 with a parabolic inner surface profile such as 32 may desirably produce seams with sloping or rounded trailing edges. By putting a glass plate 30 over the top of the two parallel overlapping thin film layers 12a, 12B and welding the material together with both heat and pressure while so held, these two layers being welded into a single seam can be conformed to the shape of that facing glass surface 32, which can effectively provide a mold. That, is, If this glass is ground in a parabolic shape or otherwise concave surface such as 32, then weld splash that is extruded from the seaming area 14 during the laser 20 operation can flow out, hit the shaped glass surface 32, and conform thereto.

In contrast, in current ultrasonic welding, the material can free-flow out of the seam and flow upwardly, to create a higher (thicker) and rougher seam area. As noted, those traits are undesirable for printer sub-systems that ride on the belt, such as a cleaning blade. The bottom or back side of an ultrasonically welded seam can be much smoother than the front. (This is due to the steel welding anvil that is under the belt material, on the side opposite from the ultrasonic welding horn, which makes the molten material conform to the flatness of that anvil on that side (but on not the other side). So on the back side of the ultrasonically welded PR belt the weld splash is not higher than the seam area. But there still can still be a step or drop. By making the mold (the glass hold-own plate surface 32) parabolic, there does not have to be a step in the welded seam area, there can be can be a gradual inclined plane. That is, with a gradual slope change on the top surface, the molten material will conform to the geometry of the glass.

The molten belt material need not stick to the glass plate, because of the very smooth surface finish on the glass plate 30 surface 32. Also, molten material that touches the glass surface 32 will almost instantly cool due to the large mass of the glass plate 30 relative to the relatively small amount of weld splash.

The claims, as originally presented, and as they may be amended, encompass variations, alternatives, modifications, improvements, equivalents, and substantial equivalents of the embodiments and teachings disclosed herein, including those that are presently unforeseen or unappreciated, and that, for example, may subsequently arise from applicants/patentees and others.

What is claimed is:

1. A method of welding together in a welding area the ends of a web segment comprising a thermally weldable material to form an endless loop belt with a welded seam; comprising compressing the overlapped ends of said web segment in said welding area with a weld-splash confining laser-light transmissive glass plate, and applying sufficient laser-light energy through said laser-light transmissive glass plate to said ends of said web segment in said weld area to thermally weld said ends together into a smoothly welded seam;

wherein said ends of said web segment are held under pressure in said welding area by being compressed between a holding system on one side of said web segment ends and said weld-splash confining laser-light transmissive glass plate on the other side of said web segment ends;

and wherein said weld-splash confining laser-light transmissive glass plate has a smoothly slightly concave surface in said welding area to effectively provide a weld spash mold to conform said weld splash thereto to provide said smoothly welded seam.

2. The method of welding together in a welding area the ends of a web segment comprising a thermally weldable material to form an endless belt with a welded seam of claim 1, wherein said endless belt is a xerographic photoreceptor belt.

3. The method of welding together in a welding area the ends of a web segment comprising a thermally weldable material to form an endless belt with a welded seam of claim 1, wherein said endless belt is an intermediate image transfer belt.

4. The method of welding together in a welding area the ends of a web segment comprising a thermally weldable material to form an endless belt with a welded seam of claim 1, wherein said holding system on one side of said web segment is a pneumatic holddown system with a planar surface opposite from said weld-splash confining laser-light transmissive glass plate.

5. The method of welding together in a welding area the ends of a web segment comprising a thermally weldable material to form an endless belt with a welded seam of claim 1, wherein said weld-splash confining laser-light transmissive glass plate has a slightly parabolic surface in said welding area.

* * * * *